US011200377B2

United States Patent
Benedict et al.

(10) Patent No.: US 11,200,377 B2
(45) Date of Patent: Dec. 14, 2021

(54) CLUSTER MODEL TO PREDICT BUILD FAILURE

(71) Applicant: EntIT Software LLC, Sunnyvale, CA (US)

(72) Inventors: Elad Benedict, Yehud (IL); Einat Atedgi, Yehud (IL); Ohad Assulin, Yehud (IL); Boaz Shor, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 1242 days.

(21) Appl. No.: 15/498,779

(22) Filed: Apr. 27, 2017

(65) Prior Publication Data

US 2018/0314953 A1 Nov. 1, 2018

(51) Int. Cl.
| | |
|---|---|
| *G06F 8/00* | (2018.01) |
| *G06N 20/00* | (2019.01) |
| *G06F 40/186* | (2020.01) |
| *G06F 40/284* | (2020.01) |
| *G06F 7/535* | (2006.01) |
| *G06F 8/71* | (2018.01) |
| *G06N 5/04* | (2006.01) |
| *G06F 8/65* | (2018.01) |

(52) U.S. Cl.
CPC ............ *G06F 40/284* (2020.01); *G06F 7/535* (2013.01); *G06F 8/00* (2013.01); *G06F 8/65* (2013.01); *G06F 8/71* (2013.01); *G06F 40/186* (2020.01); *G06N 5/045* (2013.01); *G06N 20/00* (2019.01); *G06N 5/041* (2013.01)

(58) Field of Classification Search
CPC ...... G06F 40/284; G06F 40/186; G06F 7/535; G06F 8/00; G06F 8/65; G06F 8/71; G06N 20/00; G06N 5/045; G06N 5/041
See application file for complete search history.

(56) References Cited

U.S. PATENT DOCUMENTS

| | | | |
|---|---|---|---|
| 7,730,364 B2 | 6/2010 | Chang | |
| 8,495,429 B2 | 7/2013 | Fu | |
| 8,538,897 B2 | 9/2013 | Han | |
| 10,606,723 B2* | 3/2020 | Bongale | ................ G06F 11/263 |
| 10,909,028 B1* | 2/2021 | Khanduri | ............ G06F 11/3664 |
| 2011/0296244 A1* | 12/2011 | Fu | ....................... G06F 11/3608 |
| | | | 714/37 |
| 2012/0143795 A1* | 6/2012 | Han | ................... H04L 41/0636 |
| | | | 706/12 |

(Continued)

OTHER PUBLICATIONS

Pekka Sallinen, "Use of Log Data of Information Systems in Supporting Decision Making", [Online], pp. 1-72, [Retrieved from Internet on Sep. 9, 2021], <https://trepo.tuni.fi/bitstream/handle/10024/97504/GRADU-1435210864.pdf?sequence=1> (Year: 2015).*

(Continued)

*Primary Examiner* — Ziaul A Chowdhury

(57) ABSTRACT

Techniques to create and use cluster models to predict build failures are provided. In one aspect, clusters in a set of builds may be identified. The identified clusters may be used to create a model. The model may be used to predict causes of build failures. In another aspect, a failed build may be identified. A clustering model may be retrieved. A cause of problems with the failed build may be predicted using the clustering model.

19 Claims, 7 Drawing Sheets

(56) References Cited

U.S. PATENT DOCUMENTS

| | | | | |
|---|---|---|---|---|
| 2013/0198122 | A1* | 8/2013 | Baughman | G06N 7/005 706/45 |
| 2016/0299934 | A1* | 10/2016 | Karandikar | G06F 16/248 |
| 2017/0139760 | A1* | 5/2017 | Rahman | G06F 11/3447 |
| 2017/0293543 | A1* | 10/2017 | Xu | G06F 11/008 |
| 2018/0101423 | A1* | 4/2018 | Yoon | G06F 11/323 |
| 2018/0300865 | A1* | 10/2018 | Weiss | G06T 7/10 |

OTHER PUBLICATIONS

Heng Li et al., "A Qualitative Study of the Benefits and Costs of Logging from Developers' Perspectives", [Online], pp. 1-17, [Retrieved from Internet on Sep. 9, 2021], <https://ieeexplore.ieee.org/stamp/stamp,jsp?arnumber=8976297>, (Year: 2020).*

Thomas Rausch et al., "An Empirical Analysis of Build Failures in the Continuous Integration Workflows of Java-Based Open-Source Software", [Online], pp. 345-355, [Retrieved from Internet on Sep. 9, 2021], <https://ieeexplore.ieee.org/stamp/stamp.jsp?tp=&arnumber=7962384>, (Year: 2017).*

Zhiwei Xu et al., "A Novel Fuzzy Classification to Enhance Software Regression Testing", [Online], pp. 53-58, [Retrieved from Internet on Sep. 9, 2021], <https://ieeexplore.ieee.org/stamp/stamp.jsp?arnumber=6597217>, (Year: 2013).*

Fu, et al; Digging Deeper Into Cluster System Logs for Failure Prediction and Root Cause Diagnosis; http://www.cse.chalmers.se/~mckee/papers/cluster14.pdf; Sep. 22-26, 2014; 10 pages.

Salfner, F. et al; Error Log Processing for Accurate Failure Prediction; https://www.usenix.org/legacy/event/wasl08/tech/full_papers/salfner/salfner_html/index.html; 2008; 11 pages.

Apache Spark, "Lightning-Fast Cluster Computing", Mar. 9, 2016, 4 pages.

Irina Megorskaya and Yegor Yarko, "Build Log—TeamCity 10", Apr. 28, 2016, 2 pages.

Maven, "Maven 3.1.x logging", Apr. 15, 2016, 3 pages.

Tomas Westling, Robert Sandell, "Build Failure Analyzer—Jenkins-Jenkins Wiki", Oct. 21, 2016, 8 pages.

* cited by examiner

CLUSTER MODEL TO PREDICT BUILD FAILURE

BACKGROUND

In software projects, continuous integration and deployment (CI/CD) systems are widely used to continuously build, verify, and deploy changes introduced by application developers. This build/verification/process, which may also be known as a pipeline, is comprised of modules. Modules may also be called builds and each with its own functionality (e.g. update code/compile/test/deploy/etc.).

DETAILED DESCRIPTION

Figure 1:
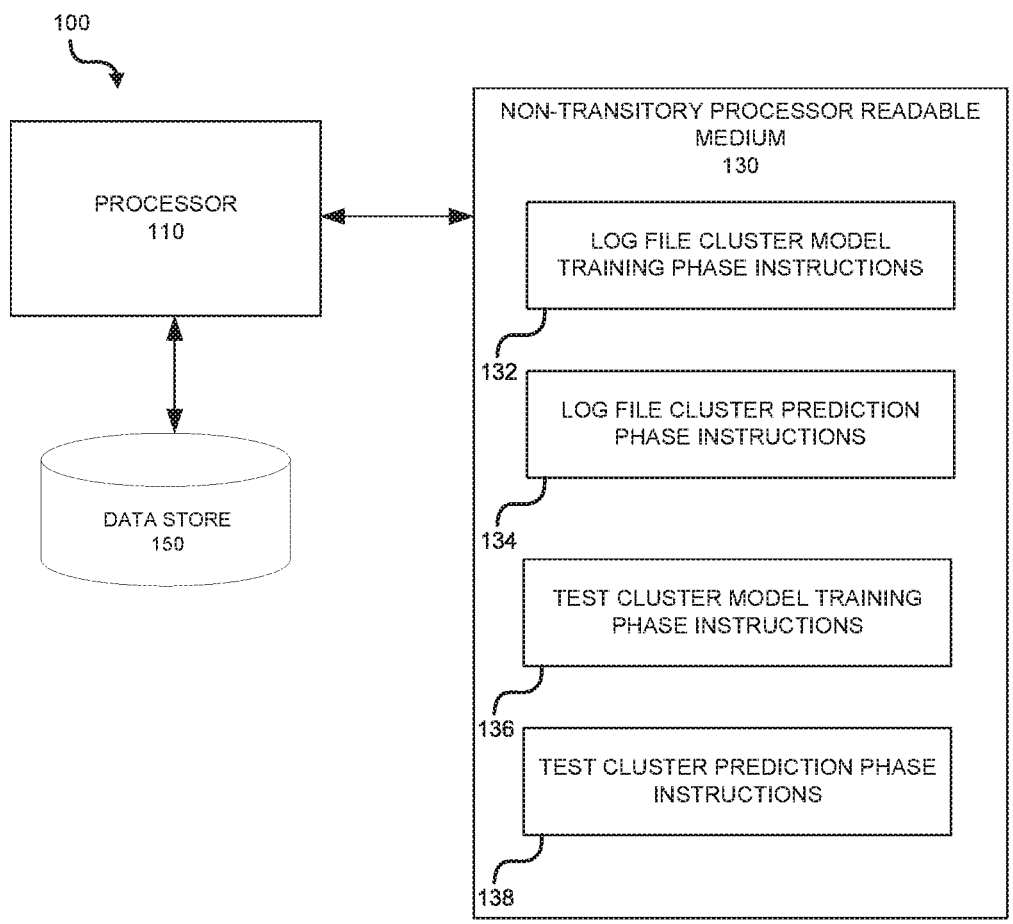
FIG. 1 depicts an example of a system that may utilize the cluster model to predict build failure techniques described herein.

A build in a CI/CD system may fail for many reasons. For example, a developer may introduce software code that is syntactically incorrect such that it causes a compilation error, preventing the build from completing. As another example, introduced code may include a semantic error. Although the build may complete, and an executable product is obtained, when that product is put through a set of regression tests, those tests may fail. When a build error occurs, it may take hours, days, or in some cases weeks, for the source of the build error to be identified and corrected.

The techniques described herein reduce that amount of time and effort that may be expended in locating build errors. For purposes of this description, a build error is any error that prevents a build from completing or prevents one or more tests from a regression test suite from passing. Build errors that prevent a build from completing may be identified in build log files. Tests that fail may be identified by execution of a suite of regression tests. Often times, the suites of regression tests are automated. However, the techniques described herein are equally applicable for manually run regression tests.

The process generally consists of two phases. In the first phase, also caused the training phase, clusters in a set of builds may be identified. A model may then be created form the identified clusters. The model may be used later to predict build failures.

In one aspect, the clusters may be log file clusters. Each log line in a log file may be tagged with a success/fail tag, which indicates if the log line is associated with a successful or a failed build. Identifying the clusters may further include sampling a set of log lines from a log file and marking those sampled log lines as centroids. A pairwise distance between each of the centroids and each remaining log line may be calculated using a distance metric. Each log line may be assigned to a closest centroid when the distance metric is below a threshold.

In another aspect, the clusters may be test clusters. Identifying the clusters may further include sampling a set of feature test vectors and marking those vectors as centroids of the test clusters. While a cluster similarity metric is not met, the following steps may occur. Each vector may be assigned to a closest centroid based on a calculated distance metric. Clusters below a size threshold may be removed. The centroids of each cluster may be redefined as the centroid of the vectors assigned to the clusters.

The second phase, also caused the prediction phase, utilizes the models created in the first phase. A failed build may be identified. A cluster model may be retrieved. A prediction of the cause of the problems with the failed build may be made by using the clustering model.

In one aspect, the clustering model models clusters of log lines from log files. Predicting a cause of problems may further include calculating a pairwise distance from each log line in a log file of the failing build to the centroids defined in the clustering model. The closest centroid for each log line may be determined based on the distance. The log line may be marked as problematic if the distance is less than a threshold.

In another aspect, the clustering model models clusters of failed tests. Predicting the cause of problems with the failed build may further include calculating a distance of a feature test vector associated with each failed test in the build to each centroid of the test clustering model. Each failed test may be assigned to the closest centroid based on the calculated distance when the calculated distance is below a threshold.

FIG. 1 depicts an example of a system that may utilize the cluster model to predict build failure techniques described herein. System 100 may include a processor 110, a non-transitory processor readable medium 130 containing processor executable instructions thereon, and a data store 150. The processor may be any type of device that is capable of executing instructions in order to implement the techniques described herein. For example, the processor may be a central processing unit (CPU), a graphics processing unit (GPU), an application specific integrated circuit (ASIC) or any other device capable of executing instructions stored on a processor readable medium.

The non-transitory processor readable medium 130 may include a set of processor executable instructions thereon. These instructions may be executed by the processor to implement the techniques described herein. For example, the medium may include log file cluster model training phase instructions 132 to create a model from log files. The model may be used in later predictions of which log lines in a log file caused a build to fail. The operation of log file cluster model training phase instructions 132 are described below and in the flow diagrams and in the remaining figures. For example, the log file cluster model training phase flow diagrams depicted in FIGS. 2 and 3 may be an implementation of log file cluster model training phase instructions.

The non-transitory medium 130 may also include log file cluster prediction phase instructions 134. The operation of the log file cluster prediction phase instructions are described below and in the flow diagrams depicted in FIGS. 5 and 6.

The medium may include test cluster model training phase instructions 136 to create a model from executed tests. The model may be used in later predictions of which tests in caused a build to fail. The operation of test cluster model training phase instructions 136 are described below and in the flow diagrams and in the remaining figures. For example, the test cluster model training phase flow diagrams depicted in FIGS. 2 and 4 may be an implementation of test cluster model training phase instructions.

The non-transitory medium 130 may also include test cluster prediction phase instructions 138. The operation of the test cluster prediction phase instructions are described below and in the flow diagrams depicted in FIGS. 5 and 7.

The system 100 may also include a data store 150. The particular form of the data store is relatively unimportant. For example, the data store may be a database. The data store may be a relational database, and object database, a key-value store, or any other mechanism for data storage. The data store may be a file based data store. The data store may be a block based data store. What should be understood is that any device capable of storing data is suitable for use with system 100.

The data store 150 may store the codebase of the software product that is utilizing the cluster model to predict build failure techniques described herein. For example, the data store may store all of the source files of the software product. The data store may also store build data, which may include information about previous builds and the results of any regression testing performed on those builds. The data store may also the log files generated as part of the builds. The data store may also store the models that are generated according to the techniques described herein.

Furthermore, it should be understood that the example implementation of system 100 as processor based is just an example. The techniques described herein are not limited to processor based systems that execute instructions. The techniques described herein are equally applicable to systems created using discrete logic and hard coded circuitry. For example, the logic may be embodied in the form of an application specific integrated circuit (ASIC), as a field programmable gate array (FPGA), a programmable logic device (PLD), or any other form of logic circuitry.

In order to better understand the cluster model to predict build failure techniques described herein, it may be beneficial to discuss log file cluster modeling and test cluster modeling separately.

Turning first to log file cluster modeling. During a build process, many pieces of information related to the build are sent to log files. Each item of information sent to a log file may be referred to as a log line. For example, a log line may be, "Build Started: Apr. 1, 2017 by user John Smith." Another example may be "Build Started: May 12, 2017 by user Ann Jones." As can be seen from these simple examples, log lines may have portions that are fixed (e.g. "Build Started") and portions, such as the user name, that are variables.

In some cases, log lines may follow a format similar to log(fixed values+parameters) e.g. log("user not found:"+ user) where user is a variable. In some cases, log lines may follow a pattern in which the contents are similar, but may not have exactly the same position within a log line. For example, a first log line may say "Build 12345 Started" to indicate a build has started and a second log line may say "Completed: Build 12345 Started" indicating that the build has now completed. Although these two log lines do not have the exact same format, they are clearly related.

The log file clustering techniques described herein find patterns in the log lines in the log files. Log lines associated with these patterns are identified and placed into clusters. Each of the log lines is associated with a build, and that build was either successful or failed. Thus each log line is associated with a success/fail tag indicating if it came from a successful build or not. Clusters that are associated with log lines that mostly come from failed builds may be considered problematic, as those log lines generally do not appear in successful builds. Thus a model of the log files may be created. This is referred to as the training phase of the model.

Creating the log file clustering model starts with obtaining the log files from a set of historical runs of the build. As mentioned above, each line in these logs is marked with a success/fail tag depending on if the build which was associated with the log file was a success or not.

The process begins by sampling a certain number of log lines form the total set of all log lines in all log files. The techniques described herein are not dependent on exactly how many log lines are sampled. In one example implementation, 6% of the total number of log lines are sampled. The log lines are essentially randomly selected. The sampled log lines may then be set as centroids in the log file clustering model. The sampled log lines may be removed from the total set of log lines.

The pairwise distance between each remaining log line and the centroids of the clustering model may be calculated. The details of calculating the distance are described in further detail below. For each log line, the closest centroid based on the distance is determined. If the distance to the closest centroid is below a threshold, the log line may be associated with that centroid. This process may continue until no more log lines are remaining or until it is determined that a sufficient number of log lines have been processed.

The distance metric may generally utilize the cosine similarity function, with some modifications. In order sensitive cosine similarity, the number of identical words in the same location in the message is counted. The modification made by the techniques used herein are that a more complex distance metric is utilized that takes into account the maximum similarity between two messages, when similarity is calculated using all permutations of parameters such as tokenizer and direction.

For example, the techniques described herein do not only use the space character to split the log lines into words. Other characters such as "-", ",", and "_" may also be used. Furthermore, the messages are compared in different directions when determining similarity. For example, the log message "Build 12345 Started" and "Completed: Build 12345 Started" would have no words in common based on position if only going in the forward direction (e.g. the word in position 1 is either Build or Completed). However, if the reverse direction is also taken into account, there are 3 of 4 words that are in common.

In addition to the tokenizer and different directions, the techniques described herein also make use of certain defined special entities which may have well defined formats. Some examples may include file-names and urls. For those special entities a special distance function may be used. For example, if a file name is found in the same location in two different log lines, it would not be scored with the cosine similarity function. Instead, a special metric that takes into account the nature of the specific entity (e.g. files) and the structure of that entity (e.g. pathname, extension, etc.).

Once the clusters have been defined, certain characteristics for each cluster may be calculated. For example, the log message that was selected as the centroid for each cluster may be identified. The size of the cluster may be identified, which is essentially the total number of log lines associated with the cluster. The fail ratio of the cluster may be identified, where the fail ratio may be the ration of the number of lines in the cluster that are associated with failed builds to the size of the cluster. If this ratio exceeds a threshold value, the cluster may be marked as a problematic cluster, indicating that lines associated with the cluster are often associated with failed builds. The cluster can also be associated with a template, which is described in further detail below.

The template of the cluster may be obtained based on the word histogram over all the log lines associated with the cluster. A template may be composed from fixed-words and variables. As briefly explained above, two log lines may be "Build Started: Apr. 1, 2017 by user John Smith" and "Build Started: May 12, 2017 by user Ann Jones." By using a word histogram, it can be shown that the first and second words are "Build Started" and the fourth and fifth words are "by user." Thus, because these words appear in those positions in all lines of this example, the words can be considered fixed. The remaining positions do not exhibit such consistency, so those positions may be considered variable. As a result, the template for this simplified example may be "Build Started xxx by user xxx" where xxx represents variable text. This template may be used later in the prediction phase, as will be described below.

During the prediction phase, a build log from a failed build is received. The latest log clustering model may be retrieved. A pairwise distance between each log line in the failed build and each cluster in the retrieve model may be calculated. The distance may be calculated as was described above. In this case, the special entities in the model may be the template defined for each cluster. Thus, a distance may be calculated from both the template of the cluster and the centroid of the cluster, taking the smaller value.

For each log line, the closest cluster is determined based on the distance. If the distance to the cluster is less than a threshold distance, and the cluster characteristics indicate the cluster is a problematic cluster, the log line may be indicated as being problematic. If the log line was not found to be close enough to any of the clusters the log line may be marked as suspicious, which means that there is nothing similar to this message seen in the past (neither associated with failed clusters of success clusters).

All of the log lines that have been marked as problematic may then be ranked according to the clusters characteristics. For example, log lines associated with clusters that are larger in size and have higher fail rations will be ranked higher than those that are smaller in size and have lower fail ratios. These rankings may then be displayed to the user, who may then use this information as a starting point in determining where to look for the specific cause of a build failure.

In some implementations, the system may utilize feedback from the user to indicate what the root cause of the failed build was. For example, consider a cluster whose template follows the general form "Build Failed: Network Error on xxxx." In this simplified example, assume that this error is only associated with builds that fail due to a network error. Once the user has discovered this association for the first time, the cluster may be marked as having a root cause of network error. When performing the prediction phase on a later build, if the ranked list of log lines has problematic lines associated with this cluster, the user may determine that the root cause of the failure is a network error and can take corrective action. Thus, in some case, the association of a log line with a cluster is all that is needed to provide a solution to the build error. In other cases, the cluster provides a good indication of which log lines to look at first when trying to find the cause of a build failure.

Now turning to test clustering. In general, once the build of a software product has completed, the product is put through a series of tests, such as regression tests. These tests may test to see if any functionality that was previously working has now ceased working. In other words, the tests are to ensure that whatever new functionality is included in the build did not break any previously working functionality. In many cases, the tests may be autonomous and not require human interactions. In other cases, the test may be run manually. The techniques described herein are not dependent on how the tests are run.

Looking first at modeling test clusters. For each test, a feature test vector is created. The feature test vector indicates for each run of the test, how many times it failed, and in which order. For example, the feature test vector (0,1,0) indicates that the test failed on the first run, was successful on the second run, and failed on the third run. As another example, the feature test vector (1,1,0) was successful on the first two runs, but failed the third time. It should be understood that although only three runs of the test are shown, this is for purposes of ease of description only. Actual feature test vectors may have hundreds or thousands of test runs.

The distance between two feature test vectors can be defined as per the following equation:

$$\text{distance} = (\max(\text{failed}) - \#\text{failed together}) / \max(\text{failed}) \quad \text{(eq. 1)}$$

Where max(failed) is the number of times one of the tests has failed. Given the example feature test vectors above, it can be seen that max(failed)=2, as the second vector failed twice. # of times failed together is 2, because both feature test vectors failed on the second run. As such, in this case the distance would be (2−1)/1=1. As should be clear, the distance metric measures how often the two tests fail together.

Now that the distance formula has been defined, the process of creating the test clustering model can be described. Initially, a set of feature test vectors are selected and each one is set as a centroid. The techniques described herein are not dependent on any particular size of the initial set of sampled feature test vectors.

The next steps are run iteratively until the clusters between iterations are sufficiently similar to one another. First, each feature test vector is assigned to the closest centroid, based on the distance function that was just described.

Next, smaller clusters may be removed. The goal of the modeling is to find larger clusters, which would represent tests that often fail together. Thus, removing smaller clusters prevents clusters from being created that only have small numbers of tests that fail together.

Finally, new centroids for each cluster are defined. The new centroids are based on the centroid that would be determined based on the feature test vectors that have actually been assigned to the cluster. In other words, the first iteration involved randomly selecting centroids. Each subsequent iteration calculates the centroid based on the feature test vectors that were assigned to the cluster.

At this point, the currently defined clusters are compared to the cluster from the previous iteration. If they are not very similar, the previous steps are repeated. If the current clusters are similar enough, then this portion of the modeling phase may end, and the model may be saved for future use.

In the prediction phase, a build may have resulted in tests failing is received. First, the previously created test cluster model is loaded. Each of the failing tests is assigned to its closest centroid in the model based on the distance function, when the distance is below a threshold (i.e. the feature test vector is "close enough" to the centroid).

As explained above, a user may have previously tagged each of the existing clusters with a root cause of the failures for the cluster. Tests that are assigned to clusters may likely have the same cause of failing as the cause that was assigned to the cluster. Thus, the predicted cause may be determined.

Those feature test vectors that are not assigned to a cluster are labeled as interesting tests and may be used to update the model. The process described above, of selecting a random set of feature test vectors to be centroids, assigning all vectors to those centroids based on distance, filtering out smaller centroids, and repeating can then be performed on the feature test vectors labeled as interesting. The new centroids determined from processing the interesting tests can then be added to the model.

Figure 2:
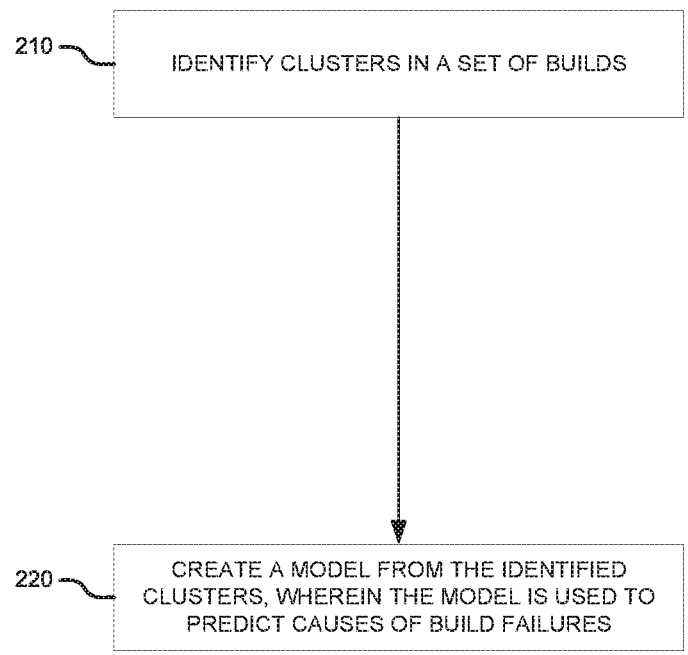
FIG. 2 depicts an example high level flow diagram for training a clustering model according to techniques described herein.

FIG. 2 depicts an example high level flow diagram for training a clustering model according to techniques described herein. In block 210, clusters in a set of builds may be identified. As explained above, in some implementations, the clusters may be clusters of log lines within a log file. In other implementations, the clusters may be clusters of verification tests.

In block 220, a model may be created from the identified clusters. The model may be used to later predict what caused a build to fail. In some cases the prediction may have also been associated a root cause, thus allowing for a determination of the root cause of a particular build failure.

Figure 3:
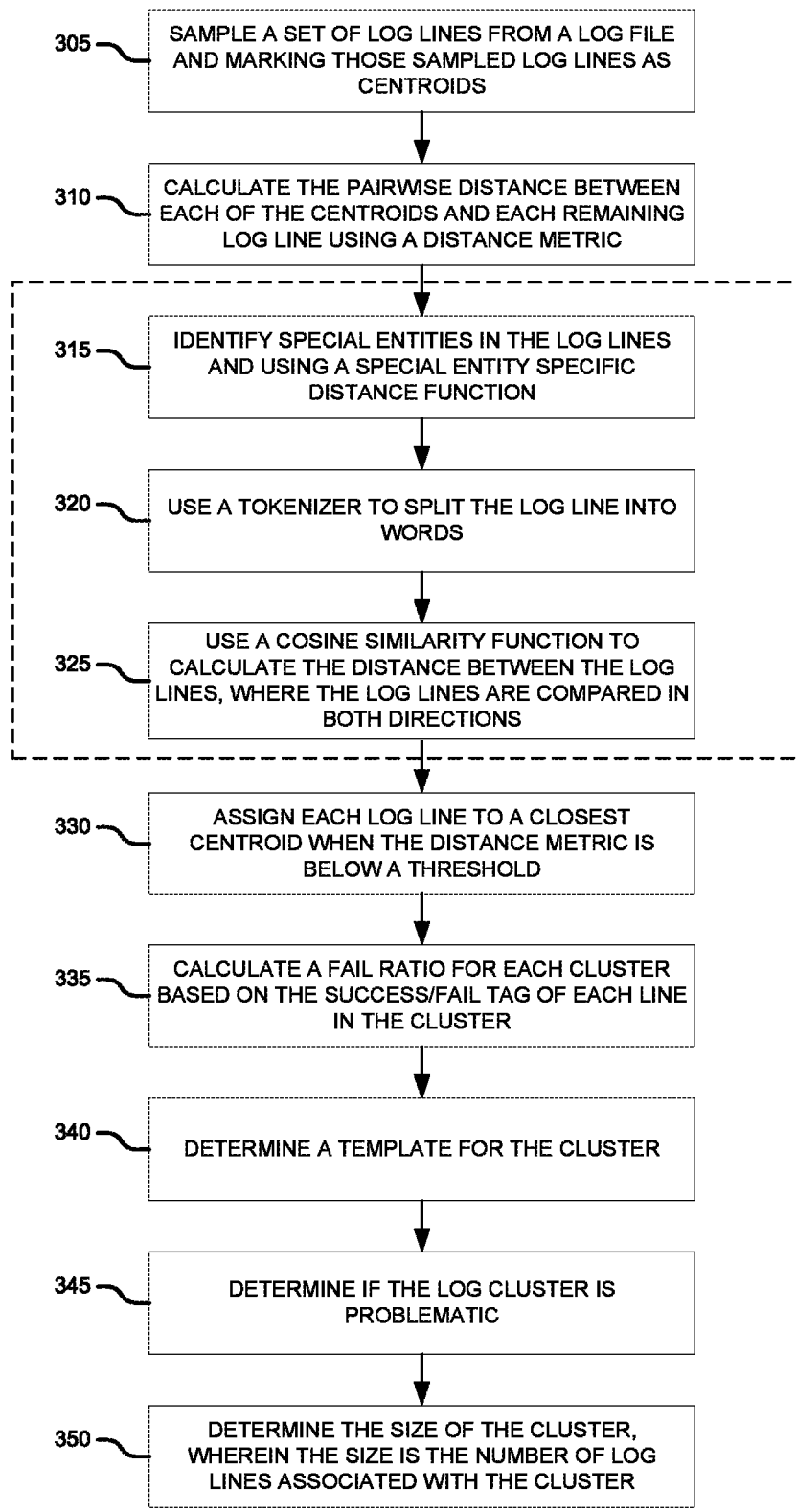
FIG. 3 depicts an example of a high level flow diagram for training a log file clustering model according to techniques described herein.

FIG. 3 depicts an example of a high level flow diagram for training a log file clustering model according to techniques described herein. In block 305, a set of log lines from a log file may be sampled. The techniques described herein are not limited to any specific number of log lines that are initially sampled. The sampled log lines may be marked as centroids.

In block 310, the pairwise distance between each of the centroids and each remaining log line may be calculated. The calculation may result in a distance metric. In other words, for each log line that was not selected to be a centroid, a distance from that log line to each centroid is calculated.

Blocks 315-325 describe a technique that may be utilized to calculate a distance metric. In block 315 special entities in the log line may be identified. A special entity specific distance function may then be used to calculate the entity specific distance. As explained above, there may be certain log lines in a log file that follow a distinct format (e.g. file name and it associated path, URLs, etc.) For these special entities, there may be a specific distance function that is used.

In block 320, a tokenizer may be used to split the log line into words. The techniques described herein are not limited to any specific type of tokenizer. A simple tokenizer may be based on spaces in the log line while more complex tokenizers may be based on other factors—such as different symbols that can appear between log words (e.g. "-", ",", ";" etc.).

In block 325, a cosine similarity function may be used to calculate the distance between the log lines. The log lines may be compared in both directions.

In block 330, each log line may be assigned to a closest centroid when the calculated distance metric is below a threshold. In other words, the minimum distance of a log line to each centroid determines the closest centroid. If that distance is less than a threshold, the log line is assigned to that determined centroid. If the distance is not less than the threshold distance, the log line may not be assigned to any centroid.

In block 335, a fail ration for each cluster may be calculated. The calculation may be based on the success/fail tag of each line in the cluster. In other words, each centroid defines a cluster. Once log lines are assigned to clusters, it is determined how many of those log lines were associated with failed builds.

In block 335, a template for the cluster may be defined. As explained above, the template for the cluster may include a pattern for log lines that are included in the cluster. In some cases, the template may have a fixed portion, and a variable portion.

In block 345, it may be determined if the cluster is problematic. In some implementations, the determination that the cluster is problematic may be based on the calculation of the fail ratio.

In block 350, the size of the cluster may be determined. The size of the cluster may be based on the number of log lines that are associated with the cluster.

Figure 4:
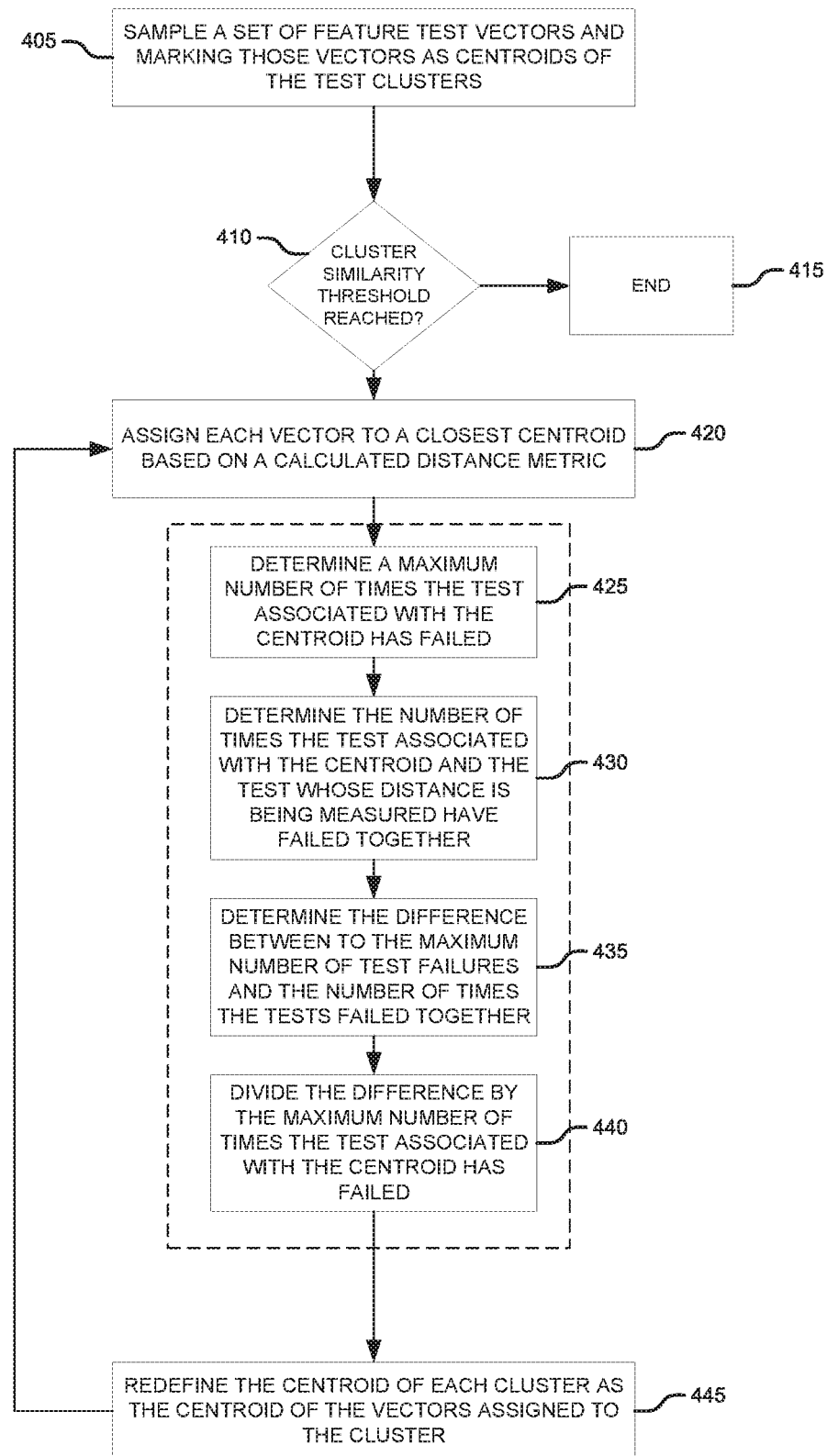
FIG. 4 depicts an example of a high level flow diagram for training a test clustering model according to techniques described herein.

FIG. 4 depicts an example of a high level flow diagram for training a test clustering model according to techniques described herein. In block 405, a set of feature vectors may be sampled. The set of sampled vectors may be marked as centroids of the test clusters.

In block 410, it may be determined if the cluster similarity threshold has been reached. As explained above, the cluster similarity threshold is a measure that determines if subsequent runs of the cluster phase have resulted in clustering models that are similar enough. In other words, once the cluster similarity threshold has been reached, it is expected that additional processing of the test clustering model would not result in significant deviations from the current model. If the threshold has been reached, the process moves to block 415 and ends. At this point, the model is ready for use in prediction, as will be described below.

If the clustering threshold has not been reached, the process moves to block 420. In block 420, each vector may be assigned to a closets centroid. The assignment may be based on a calculated distance metric. Blocks 425-440 describe the process of determining the distance metric in further detail.

In block 425, a maximum number of times the test associated with the centroid has failed is determined. In other words, for each defined centroid, the maximum number of times the test failed is determined.

In block 430, the number of times the test associated with the centroid and the test whose distance is being measured have failed together may be determined. In other words, the number of times the current test and the test associated with the centroid both failed is determined.

In block 435, the difference between the maximum number of test failures and the number of times the test failed together is determined. In other words, it is determined how many times the test associated with the centroid and the current test whose distance is being calculated did not fail together.

In block 440, the difference may be divided by the maximum number of times the test associated with the centroid has failed. In other words, the percentage of times the test associated with the centroid and the test whose distance is being calculated did not fail together is calculated.

In block 445, the centroid of each cluster may be redefined as the centroid of the vectors assigned to the cluster. In other words, the cluster centroids are initially randomly defined. The centroids are then redefined to be the centroid of the vectors assigned to the selected cluster (i.e. the centroid is not selected, but is determined based on the actual vectors assigned to the cluster). The process then returns to block 420 and repeats until the cluster similarity threshold is reached, at which point the model training is complete.

Figure 5:
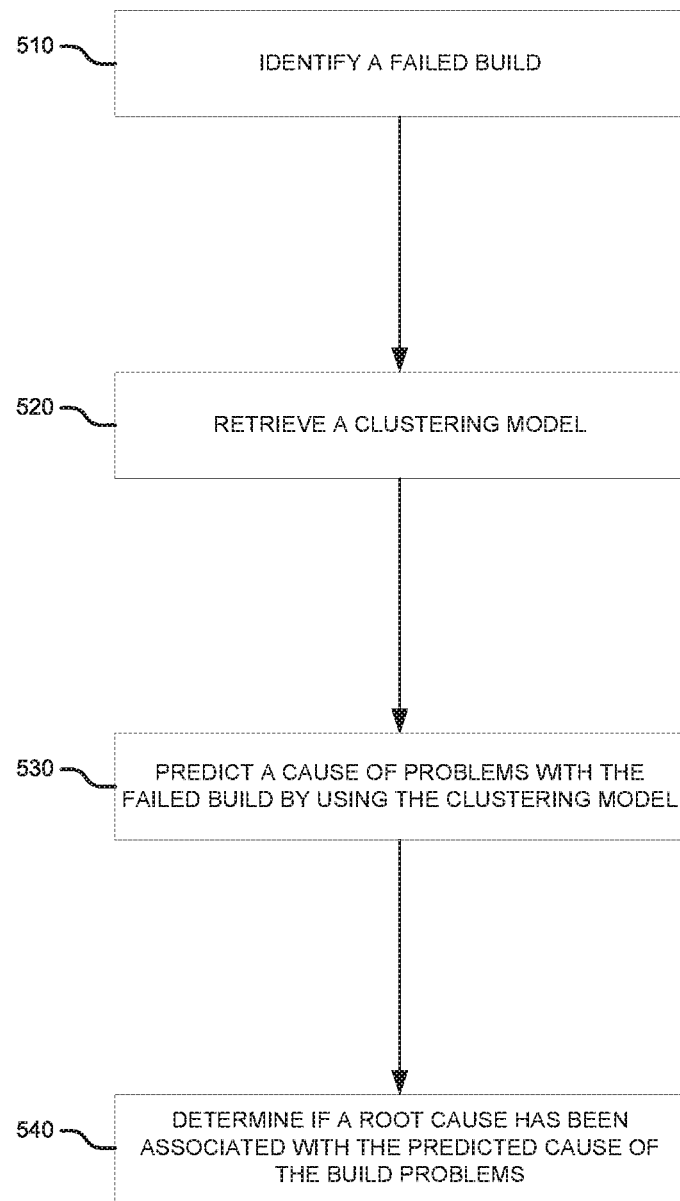
FIG. 5 depicts an example high level flow diagram for using a clustering model to predict build failures utilizing techniques described herein.

FIG. 5 depicts an example high level flow diagram for using a clustering model to predict build failures utilizing techniques described herein. In block 510, a failed build may be identified. As explained above, a failed build may include an error in the build of the product, such as a compilation error, or other such error that is reflected in a log file. Or the failed build may occur from a verification test of the build failing.

In block 520, a clustering model may be retrieved. As explained above, two type of clustering models have been described. Log clustering models for use with log files and test clustering models for use with test clusters. depending on the type of build failure being analyzed, the appropriate model may be retrieved.

In bloc 530, a cause of the problems may be predicted using the clustering model. As explained above and in more detail below, the log or test clustering model may be used to help provide an indication of the particular log lines or test failures are the ones that caused the build to fail.

In block 540, it may be determined if a root cause has been associated with the predicted cause of the build problems. As explained above, a root cause may be associated with each failing cluster. By utilizing the techniques described herein, a prediction may be made as to what caused a build to fail by clustering the build failures. If a root cause has been associated with the cluster, the root cause of the build failure may be determined.

Figure 6:
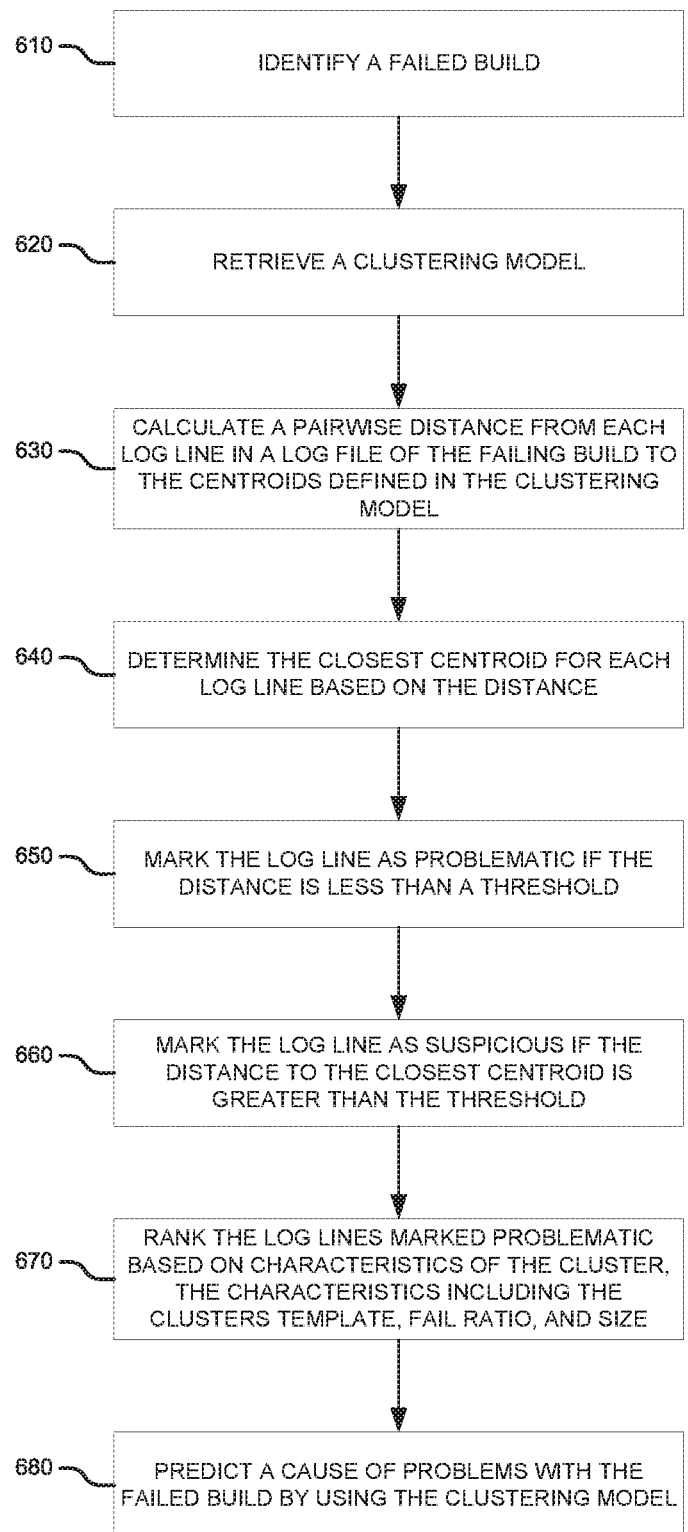
FIG. 6 depicts an example high level flow diagram for using a log file clustering model to predict build failures utilizing techniques described herein.

FIG. 6 depicts an example high level flow diagram for using a log file clustering model to predict build failures utilizing techniques described herein. In block 610, just as in block 510, a failed build may be identified. In block 620, just as in block 520, a clustering model may be retrieved.

In block 630, a pairwise distance from each log line in a log file of the failing build may be calculated. The distance may be calculated between the log lines in the failed build log file and the centroids defined in the retrieved clustering model.

In block 640, the closest centroid to each log line may be determined. The closest centroid may be determined based on the calculated distance.

In block 650 the log line may be marked as problematic if the distance is less than a threshold. In other words, if the log line is close enough to a cluster that has been marked as problematic, then the log line itself may be problematic.

In block 660, the log line may be marked as suspicious if the distance to the closest centroid is greater than the threshold. In other words, if the log line is not close enough to belong to a particular cluster, but yet is still associated with a failed build, the line may still be the source of the build failure. As such, it is marked as suspicious for later investigation if it should turn out that the build failure was not caused by a line marked as problematic.

In block 670, the log lines marked as problematic may be ranked. The ranking may be based on characteristics of the cluster. The characteristics of the cluster may include the clusters template, fail ratio, and size. In other words, the problematic log lines are ranked in order of what is more likely to have caused the build to fail.

In block 680, a cause of the build problems may be predicted by using the clustering model. The predicted cause may be associated with the highest ranked problematic log line.

Figure 7:
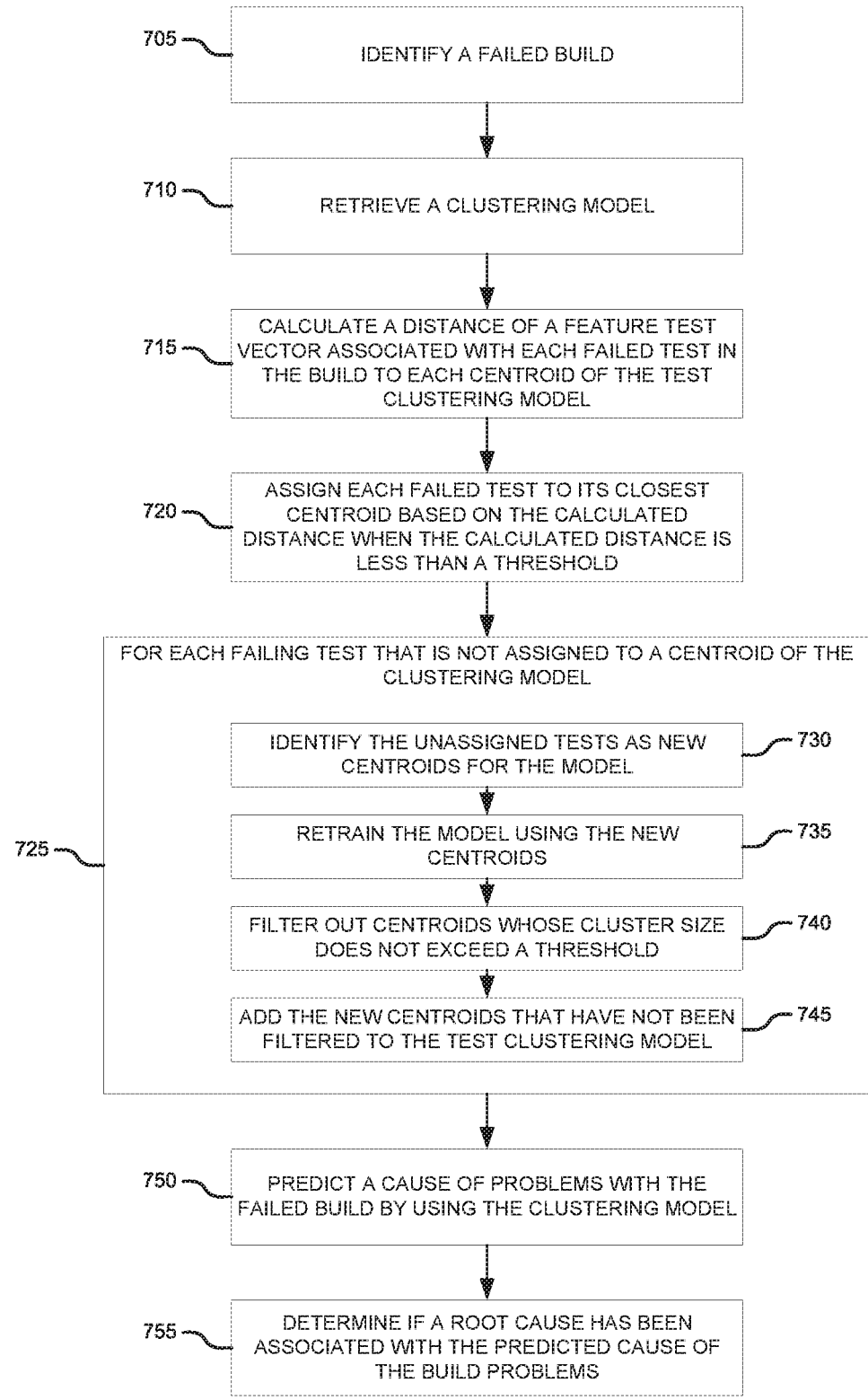
FIG. 7 depicts an example high level flow diagram for using a test clustering model to predict build failures utilizing techniques described herein.

FIG. 7 depicts an example high level flow diagram for using a test clustering model to predict build failures utilizing techniques described herein. In block 710, just as in block 510, a failed build may be identified. In block 720, just as in block 520, a clustering model may be retrieved In block 715, a distance of a feature test vector associated with each failed test may be calculated. The distance may be the distance between the feature test vector and each centroid of the retrieved test clustering model. In other words, an attempt to determine which centroid, and hence cluster, is the most similar to the failed test.

In block 720, each failed test may be assigned to its closest centroid based on the calculate distance when the calculated distance is less than a threshold. In other words, if the failed test is close enough to a centroid, the failed test will be associated assigned to the cluster that includes that centroid.

In block 725, several steps may be performed for each failing test that is not assigned to a centroid of the clustering model. In other words blocks 730-745 are performed on all failed tests that were not close enough to any existing clusters.

In block 730, the unassigned test may be defined as new centroids for the model. These new centroids may become new centroids for the overall model.

In block 735, the model may be retrained using the new centroids. For example, the steps described above in FIGS. 2 and 4 may be performed to create a new model.

In block 740, centroids whose cluster size falls below a threshold may be filtered out. In other words, if few tests are assigned to a given cluster, that cluster is likely not useful in predicting that cause of a build failure and as such, the cluster may be filtered out.

In block 745, the new centroids that have not been filtered out in the previous steps may be added to the clustering model. Thus, new clusters are added to the model, and the model is constantly retrained as new filing builds are received.

In block 760, a cause of the problems with the failed build may be predicted by using the clustering model. In block 755, if a root cause has been associated with the predicted cause of the build problems, the root cause of the build problem may be determined.

We claim:

1. A method comprising:
   creating, by a processor of a computing device, a clustering model from a computer log file, including:
   sampling, by a processor, a set of log lines in the computer log file, wherein each log line in the computer log file is marked with a success tag or a fail tag that indicates the log line comes from a successful build or a failed build,
   marking, by a processor, the sampled log lines as centroids of clusters of the clustering model,
   assigning, by a processor, remaining log lines in the computer log file to the clusters of the clustering model, by: for each remaining log line, identifying one of the centroids that is closest to the remaining log line, and assigning the remaining log line to a cluster that contains the closest centroid, and
   determining, by the processor, characteristics for the clusters of the clustering model based on a total number of log lines in each cluster that are marked with the fail tag, wherein when the total number of log lines in a cluster that are marked with the fail tag is greater than a threshold number, the cluster is determined to have a problematic characteristic;

receiving, by the processor, a log of a new failed build;

determining, by the processor, which log lines in the new failed build are associated with the clusters of the clustering model that have the problematic characteristic; and causing, by the processor, a display on the computing device of the log lines in the new failed build that are associated with the clusters that have the problematic characteristic as predicted causes of the new failed build.

2. The method of claim 1, wherein assigning the remaining log lines in the log file to the clusters of the clustering model comprises:

calculating pairwise distances between each remaining log line and each of the centroids using a distance metric;

identifying the closest centroid for each remaining log line based on the calculated pairwise distances; and assigning each remaining log line to the cluster that contains the closest centroid when a pairwise distance between the remaining log line and the closest centroid is below a distance threshold.

3. The method of claim 2, wherein calculating the pairwise distances between each of the remaining log lines and each of the centroids using the distance metric comprises:

identifying special entities in the remaining log lines and using a special entity specific distance function;

using a tokenizer to split the remaining log lines into words; and using a cosine similarity function to calculate the pairwise distances between each of the remaining log lines and each of the centroids, wherein each of the remaining log lines is compared with each of the centroids in both directions.

4. The method of claim 1, wherein determining the characteristics for the clusters of the clustering model comprises:

calculating a fail ratio for each of the clusters based on the total number of log lines in each cluster that are marked with the fail tag;

determining a template for each of the clusters;

determining if each of the clusters is problematic based on the fail ratio for the cluster; and determining a size of each of the clusters, wherein the size of each cluster is the total number of log lines in the cluster.

5. The method of claim 4, wherein the template for each cluster comprises:

fixed words which are words that appear in same positions in all log lines of the cluster, and variables which are words that do not appear in the same positions in all log lines of the cluster.

6. The method of claim 1, further comprising: creating test clusters, including:

sampling a set of feature test vectors and marking the sampled feature test vectors as centroids of the test clusters, wherein the feature test vectors are created for a plurality of runs of a test of a plurality of builds;

determining whether a cluster similarity from the plurality of runs of the test has reached a similarity threshold;

in response to a determination that the cluster similarity has not reached the similarity threshold:

assigning each remaining feature test vector to a closest centroid of the test clusters based on a calculated distance metric; and redefining the centroids of the test clusters as the centroids of the feature test vectors assigned to the test clusters.

7. The method of claim 6, wherein each of the feature test vectors indicates a pass or fail history of one of the plurality of runs of the test of the plurality of builds.

8. The method of claim 7, further comprising: calculating the distance metric for each remaining feature test vector, including:

determining a maximum number of times the test associated with the centroids has failed;

determining a number of times the test associated with the centroids and the test whose distance is being measured have failed together;

determining a difference between to the maximum number of times the test associated with the centroids has failed and the number of times the tests failed together; and dividing the difference by the maximum number of times the test associated with the centroids has failed.

9. A non-transitory computer readable medium storing instructions that when executed by a processor of a computing device cause the processor to:

create a clustering model from a computer log file, including instructions that cause the processor to:

sample a set of log lines in the computer log file, wherein each log line in the computer log file is marked with a success tag or a fail tag that indicates the log line comes from a successful build or a failed build, mark the sampled log lines as centroids of clusters of the clustering model, assign remaining log lines in the computer log file to the clusters of the clustering model, by: for each remaining log line, identifying a centroid that is closest to the remaining log line, and assigning the remaining log line to one of the clusters that contains the closest centroid, and determine characteristics for the clusters of the clustering model based on a total number of log lines in each cluster that are marked with the fail tag, wherein when the total number of log lines in a cluster that are marked with the fail tag is greater than a threshold number, the cluster is determined to have a problematic characteristic;

receive a log of a new failed build;

determine which log lines in the new failed build are associated with the clusters of the clustering model that have the problematic characteristic; and cause a display on the computing device of the log lines in the new failed build that are associated with the clusters that have the problematic characteristic as predicted causes of the new failed build.

10. The non-transitory computer readable medium of claim 9, wherein, to assign the remaining log lines in the log file to the clusters of the clustering model, the instructions further cause the processor to:

calculate pairwise distances between each remaining log line and each of the centroids using a distance metric;

identify the closest centroid for each remaining log line based on the calculated pairwise distances; and assign each remaining log line to the cluster that contains the closest centroid when a pairwise distance between the remaining log line and the closest centroid is below a distance threshold.

11. The non-transitory computer readable medium of claim 9, wherein the instructions cause the processor to:
sample a set of feature test vectors and mark the sampled feature test vectors as centroids of test clusters, wherein the feature test vectors are created for a plurality of runs of a test of a plurality of builds;
determine whether a cluster similarity from the plurality of runs of the test has reached a similarity threshold;
in response to a determination that the cluster similarity has not reached the similarity threshold:
assign each remaining feature test vector to a closest centroid of the test clusters based on a distance metric; and
redefine the centroids of the test clusters as the centroids of the feature test vectors assigned to the test clusters.

12. The non-transitory computer readable medium of claim 11, wherein the instructions further cause the processor to:
filter out any test clusters whose cluster size does not exceed a size threshold.

13. The non-transitory computer readable medium of claim 9, wherein the instructions cause the processor to:
determine if a root cause has been associated with the predicted causes of the failed build.

14. A computing device comprising:
a processor; and
a memory storing instructions that when executed by the processor cause the processor to:
create a clustering model from a computer log file, including instructions that cause the processor to:
sample a set of log lines in the computer log file, wherein each log line in the computer log file is marked with a success tag or a fail tag that indicates the log line comes from a successful build or a failed build,
mark the sampled log lines as centroids of clusters of the clustering model,
assign remaining log lines in the computer log file to the clusters of the clustering model, by: for each remaining log line, identifying a centroid that is closest to the remaining log line, and assigning the remaining log line to one of the clusters that contains the closest centroid, and
determine characteristics for the clusters of the clustering model based on a total number of log lines in each cluster that are marked with the fail tag, wherein when the total number of log lines in a cluster that are marked with the fail tag is greater than a threshold number, the cluster is determined to have a problematic characteristic;
receive a log of a new failed build;
determine which log lines in the new failed build are associated with the clusters of the clustering model that have the problematic characteristic; and
cause a display on the computing device of the log lines in the new failed build that are associated with the clusters that have the problematic characteristic as predicted causes of the new failed build.

15. The computing device of claim 14, wherein, to assign the remaining log lines in the log file to the clusters of the clustering model, the instructions further cause the processor to:
calculate pairwise distances between each remaining log line and each of the centroids using a distance metric;
identify the closest centroid for each remaining log line based on the calculated pairwise distances; and
assign each remaining log line to the cluster that contains the closest centroid when a pairwise distance between the remaining log line and the closest centroid is below a distance threshold.

16. The computing device of claim 15, wherein the instructions cause the processor to:
mark one of the remaining log lines as suspicious when the pairwise distance between the remaining log line and the closest centroid is greater than the distance threshold.

17. The computing device of claim 16, wherein the instructions cause the processor to:
mark the log lines in the new failed build that are associated with the clusters that have the problematic characteristic as problematic; and
rank the marked log lines based on sizes of the clusters that are associated with the marked log lines.

18. The computing device of claim 14, wherein the instructions further cause the processor to create test clusters, including causing the processor to:
calculate a distance between a feature test vector associated with each failed test of a build and each centroid of the test clusters; and
assign the feature test vector associated with each failed test to a closest centroid of the test clusters based on the calculated distance when the calculated distance is less than a distance threshold.

19. The computing device of claim 18, wherein the instructions cause the processor to:
filter out any test clusters whose cluster size does not exceed a size threshold.

* * * * *